United States Patent
Engelen et al.

(10) Patent No.: US 11,613,142 B2
(45) Date of Patent: Mar. 28, 2023

(54) WHEEL HUB ASSEMBLY FOR VEHICLES

(71) Applicant: Aktiebolaget SKF, Gothenburg (SE)

(72) Inventors: Philip Engelen, Utrecht (NL); Giorgio Missiaggia, Piscina (IT); Albertus Maria van der Vorst, Utrecht (NL)

(73) Assignee: AKTIEBOLAGET SKF

( * ) Notice: Subject to any disclaimer, the term of this patent is extended or adjusted under 35 U.S.C. 154(b) by 641 days.

(21) Appl. No.: 16/732,897

(22) Filed: Jan. 2, 2020

(65) Prior Publication Data
US 2020/0215849 A1    Jul. 9, 2020

(30) Foreign Application Priority Data

Jan. 9, 2019 (IT) .................. 102019000000250

(51) Int. Cl.
| | | |
|---|---|---|
| *B60B 7/00* | (2006.01) | |
| *B60B 27/00* | (2006.01) | |
| *F16C 33/72* | (2006.01) | |

(52) U.S. Cl.
CPC ........ *B60B 7/0013* (2013.01); *B60B 27/0073* (2013.01); *F16C 33/723* (2013.01); *F16C 2326/02* (2013.01)

(58) Field of Classification Search
CPC ... B60B 27/02; B60B 27/0073; B60B 7/0013; B60B 7/066; F16C 33/723; F16C 2326/02
See application file for complete search history.

(56) References Cited

U.S. PATENT DOCUMENTS

| | | | | |
|---|---|---|---|---|
| 9,505,264 | B2* | 11/2016 | Morello | F16C 33/723 |
| 10,093,126 | B2* | 10/2018 | Weigand | B60B 27/0073 |
| 2002/0126926 | A1* | 9/2002 | Ohtsuki | F16C 33/723 |
| | | | | 384/448 |
| 2007/0052284 | A1* | 3/2007 | White | B60B 7/14 |
| | | | | 301/108.1 |
| 2011/0206312 | A1 | 8/2011 | Schumacher | |

FOREIGN PATENT DOCUMENTS

EP    2865536    4/2015

OTHER PUBLICATIONS

International Search Report for corresponding Italy Patent Appln. No. 201900000250 dated Sep. 27, 2019.

* cited by examiner

*Primary Examiner* — Scott A Browne
(74) *Attorney, Agent, or Firm* — Reed Smith LLP

(57) ABSTRACT

A wheel hub assembly assembly having a central axis (X) and covers therefore. An outer ring provided with a tubular mounting portion, and a cover having a keying portion which is inserted inside the tubular mounting portion. The cover is made of plastic material, the keying portion comprises an annular seat made of plastic and a sealing element made of rubbery elastic material. The sealing element is defined by a solid of rotation mounted inside the annular seat over a whole of an axial length of the annular seat so as to project radially outside of the annular seat to make contact with the tubular mounting portion of the outer ring thereby sealingly closing the wheel hub assembly.

7 Claims, 1 Drawing Sheet

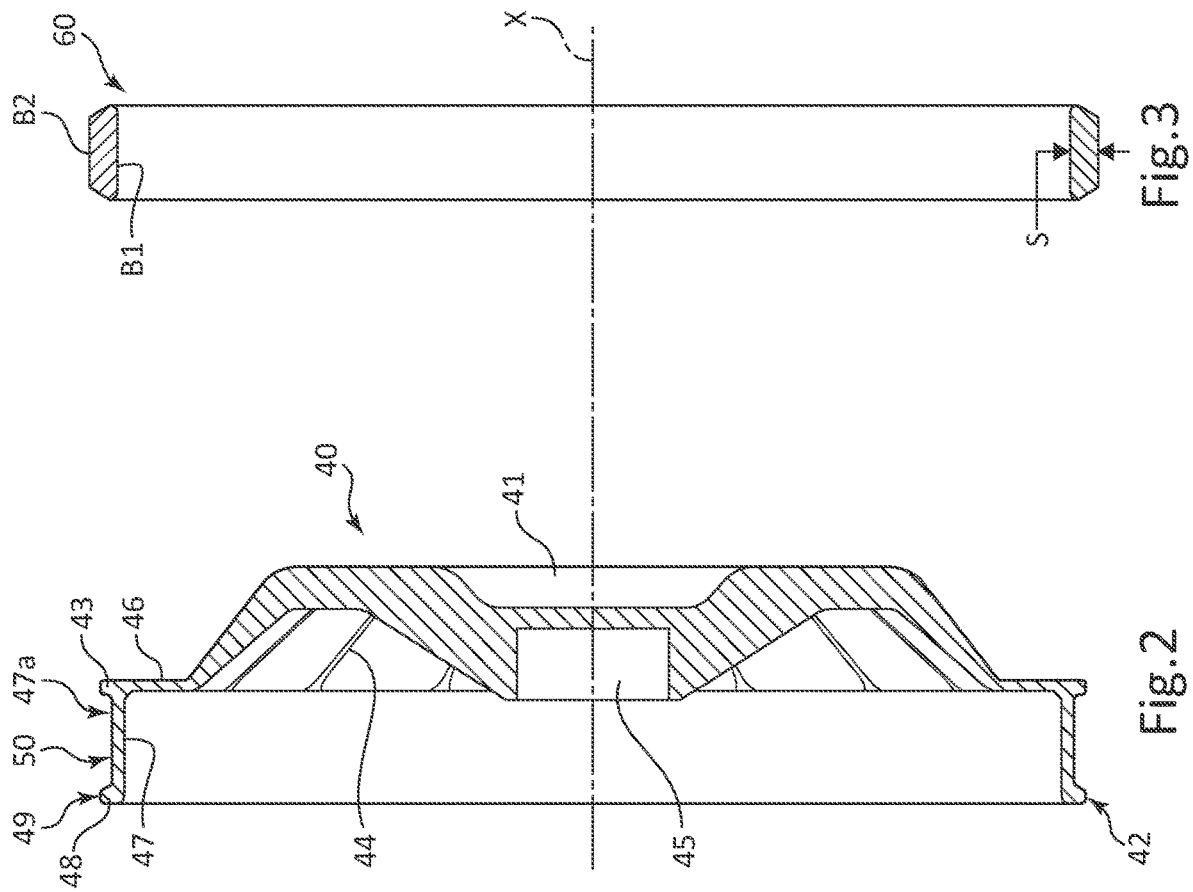
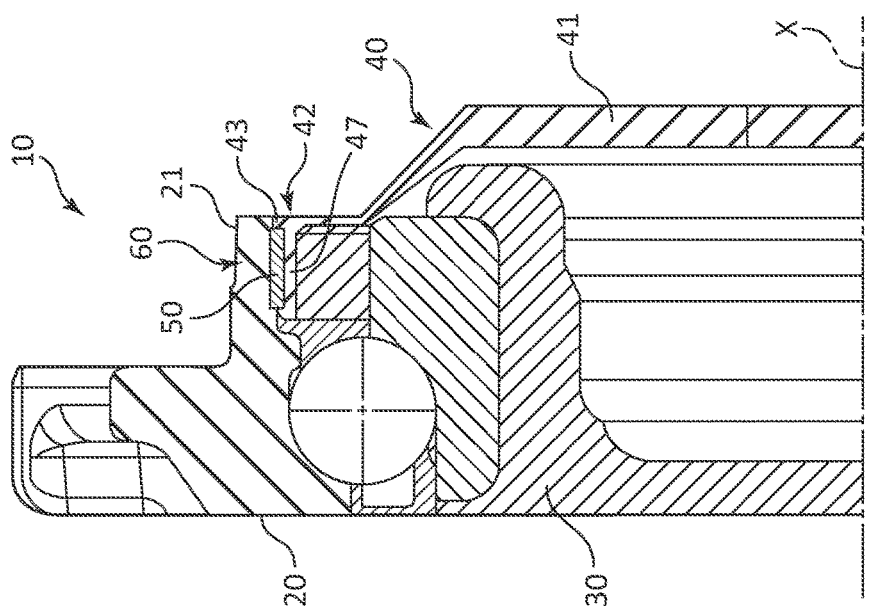

WHEEL HUB ASSEMBLY FOR VEHICLES

CROSS-REFERENCE TO RELATED APPLICATION

This application claims the benefit of priority to Italian Application No. 102019000000250 of the same title filed on Jan. 9, 2019, under 35 U.S.C. § 119, the entire contents of which are incorporated herein by reference.

FIELD

The exemplary embodiments disclosed herein relate to a wheel hub assemblies.

BACKGROUND

Wheel hub assemblies may be arranged between an upright and a wheel, e.g., of a vehicle so as to allow rotation of the wheel with respect to the upright. Such a wheel hub includes a flanged outer ring assembled on an upright and also includes a closing cover that is applied on such a flanged outer ring so as to close at least one side thereof.

A flanged outer ring is provided with a tubular mounting portion inserted inside a respective cylindrical seat of the upright, while the closing cover is mounted inside the tubular portion so as to protect the inside of the flanged outer ring and is provided with a cylindrical keying portion engaged inside the tubular mounting portion. In order to ensure sealing between an assembly of a flanged outer ring and a cover, a cover is normally made of metallic material and is provided with a sealing element made of rubbery material vulcanized around the cylindrical keying portion so as to be compressed between the said cylindrical keying portion and the tubular mounting portion.

BRIEF DESCRIPTION OF THE DRAWINGS

The invention will now be described with reference to the accompanying drawings which illustrate a non-limiting example of embodiment thereof, in which:

FIG. 1 is a cross-sectional view, with parts removed for greater clarity, of a preferred embodiment of wheel hub assemblies in accordance with this disclosure; and FIG. 2 is a cross-section view of wheel hub assemblies in accordance with this disclosure; and FIG. 3 is a cross-section view of wheel hub assemblies in accordance with this disclosure.

DETAILED DESCRIPTION

In known wheel hub assemblies, sealing element made of rubbery material must be vulcanized around a tubular mounting portion, tubular mounting portions require special technical features such as annular grooves, seats or recesses, in particular shaped parts, so as to allow both correct burr-free vulcanization and correct positioning of the vulcanized rubber. These vulcanization operations and said special technical features of tubular mounting portions increase costs for production of a closing cover and of assembly of closing covers with flanged outer rings. Therefore, costs associated with wheel hub assembly are relatively high and no longer competitive in the market which, at present, increasingly requires a reduction of costs while, on the other hand, there is a constant evolution in the technical characteristics of the products.

With reference to FIG. 1, 10 denotes in its entirety a wheel hub assembly for vehicles. A wheel hub assembly, e.g., wheel hub assembly 10 has a central axis X and may be mounted on an upright of a vehicle (not shown). In some embodiments, a wheel hub assembly includes a flanged outer ring 20 provided with a tubular mounting portion 21 inserted in said upright, an inner support ring 30 for a wheel of the vehicle (not shown) and inserted radially inside the outer ring 20; and a cover 40 arranged so as to close an inner axial side or "inboard" side of the flanged outer ring 20.

In some embodiments, a cover 40 is made of a plastic material and therefore, compared to the known covers made of metal, is both lighter and may be produced with a greater flexibility in terms of form. Covers, e.g., cover 40, may include a shaped end wall 41 substantially transverse to the axis X, and a cylindrical keying portion 42, which is arranged substantially along a peripheral edge 43 of shaped wall 41. Such a cylindrical keying portion may extend projecting along the axis X from peripheral edge 43 and is keyed inside the tubular mounting portion 21 so as to rigidly connect together an outer ring 20 and cover 40.

As shown more clearly in FIG. 2, in some embodiments, a shaped end wall 41 comprises a plurality of shaped radial ribs 44 which extend from a common central core 45 so as to provide a cover 40 with rigidity, and annular wall 46, which is transverse to the axis X and, on a radially outer side, defines a peripheral edge 43, while, on an opposite radially inner side, it connects together all the shaped radial ribs 44. In some embodiments in accordance with this disclosure, a cylindrical keying portion 42 comprises a cylindrical bracket 47 which is force-fitted inside annular wall 46 substantially along peripheral edge 43 so as to extend projecting from annular wall 46 along the axis X and has, in turn, a free edge 48 folded back radially outwards. In particular, the bracket 47 is radially bounded outwardly by a cylindrical surface 47a and is force-fitted inside the annular wall 46 at a radial distance from the axis X such that a dimension of the radial height of peripheral edge 43 projecting on the outside of the cylindrical surface 47a is equal to a dimension of the radial height of the free edge 48: the same dimension of the radial height of edges 43 and 48 defines a cylindrical surface 49 which delimits a physical dimension of the cover 40 and moreover defines, together with the cylindrical surface 47a, an annular seat 50 open radially outwards and bounded axially by edges 43 and 48.

In some embodiments in accordance with this disclosure, as shown in FIG. 3, a cylindrical keying portion 42 further comprises a sealing element 60 which is made of rubbery elastic material and is mounted inside the annular seat 50. A sealing element 60 may be defined by, among other things, a solid of rotation with a preferably, but not necessarily, substantially trapezoidal cross-section, where a larger base B1 has an axial length equal to an axial distance between the edges 43 and 48, a smaller base B2 has an axial length smaller than an axial distance between the edges 43 and 48, and an associated radial height or thickness S of the element 60 has dimensions greater than the dimensions of the radial height of the edges 43 and 48 so as to allow smaller base B2 to project radially outwards from the surface 49. Alternatively, in order to avoid having to adjust directionally a sealing element, e.g., 60, before mounting it inside a seat, e.g., 50, two bases may have substantially, if not practically, the same axial length. The description which follows will in any case make reference to the preferred embodiments of the present invention as shown in the attached figures, but may also be applicable to the case where the sealing element 60 is defined by a solid of rotation with a substantially rectangular cross-section, or any other suitably shaped cross section.

According to an embodiment which is not shown in the attached figures, but which may be easily deduced from the description given here, a radial edge 43, e.g., may have a radial height greater than the radial height of the edge 48 and equal to the radial thickness S of the sealing element 60 with radial dimensions: in this configuration the axial containing capacity of seat 50 is increased during, in particular, keying of the cover 40 inside the ring 20.

The nominal manufacturing diameter of a sealing element, e.g., 60, namely a nominal diameter of a sealing element, e.g., 60, before it is mounted inside a seat, e.g., 50, has dimensions smaller than the dimensions of the outer diameter of the cylindrical surface 47a, namely the end surface of exemplary seat 50 and, owing to this difference in dimensions and the elastic modulus of the rubbery elastic material from which a sealing element, e.g., may be made, the latter may not only be easily mounted inside a seat, e.g, 50, but remains axially and angularly connected to an end surface of seat 50, namely to the cylindrical surface 47a, without any need, for example, for glues or particular treatment of the said cylindrical surface 47a.

From the above description it is clear that the cylindrical keying portion 42 is essentially formed by a bracket, e.g., 47 and by a sealing element, e.g., 60 mounted inside a seat, e.g., 50; since cover 40 is made of plastic material, dimensions, preferably the thicknesses, of a bracket, e.g., 47, and of an annular wall, e.g., 46, and ribs, e.g., 44 may be easily defined so as to provide a bracket, e.g., 47 with an optimum flexibility so as to allow a cover, e.g., 40 to be mounted in such a way that a sealing element, e.g., 60, is positioned correctly in radial contact with tubular mounting portion 21 of a flanged outer ring 20 and, owing to its radial compression inside seat 50 and the elastic return and rigidity of a bracket 47, it ensures a sealing action even superior to the sealing action of the present-day covers in use provided with vulcanized rubbers.

The technical advantages the various embodiments in accordance with this disclosure, due first and foremost to the use of a sealing element, e.g., 60 made of rubbery elastic material and assembled together with a cover, e.g., 40 and, secondly, due to the use also of a cover, e.g., 40 made of plastic material, are therefore clear. These advantages undoubtedly consist in the ease and low cost of production of covers, e.g., 40; these reduced costs essentially benefiting wheel hub assemblies, e.g., 10 in accordance with this disclosure, and in the increase in sealing capacity of covers in accordance with this disclosure, e.g., 40 having an outer ring 30. In fact, owing to the ease of production of such a cover, e.g., 40, and a sealing element, e.g., 60, it is possible to calculate a size of a bracket 47, or seat 50, and of smaller base B2 and a radial thickness S of sealing elements, e.g., 60 in an optimum manner depending on both the dimensions of the flanged outer ring 20 and the axial length of the tubular mounting portion 21 inserted in said upright. Moreover, a trapezoidal form of a solid of rotation defining a sealing element, e.g., 60 allows axial insertion of a cylindrical keying portion, e.g., 42 inside a tubular mounting portion, e.g., 21 without any wrinkling of the said sealing element 60.

Form the above description it is clear that the axial dimension of the smaller base B2 of the sealing element 60 is relatively high and allows the said element 60 to cover a very large area of the tubular mounting portion 21 of the flanged outer ring 20, while improving the sealing capacity of the cover 40, thereby improving the working life and uniform performance of the wheel hub assembly 10 according to the present invention, which is applicable not only to the configuration as described above, but in general to any wheel hub assembly for vehicles.

In some embodiments, a wheel hub assembly is for use in connection with vehicles, and has an a central axis (X), an outer ring 20 provided with a tubular mounting portion 21, and a cover 40 for closing an outer ring 60 and having a keying portion 42 which is inserted inside tubular mounting portion 21. Such a wheel hub assembly includes a cover 70 made of plastic material and a keying portion 42. A keying portion may include an annular seat 50 made of plastic and with a given axial length, and a sealing element 60 made of rubbery elastic material and defined by a solid of rotation may be mounted inside an annular seat 50 over the whole of the said axial length so as to project radially outside of an annular seat 50 and make contact with a tubular mounting portion 21 of the outer ring 20, thereby sealingly closing the assembly 10.

In some interrelated embodiments, a wheel hub assembly includes an annular seat 50 that has a cylindrical end surface 47a and a sealing element 60 made of rubbery elastic material. Sealing element 60 has a nominal diameter with dimensions smaller than the dimensions of an outer diameter of the cylindrical end surface 47a and an elastic modulus such as to ensure an angularly and axially stable connection between said annular seat 50 and sealing element 60.

In some interrelated embodiments, a wheel hub assembly has a seat 50 that is axially bounded by respective radial edges 43, 48 for axially containing sealing element 60, which projects radially outside of at least a first radial edge 48 of the said two radial edges 43, 48.

In some interrelated embodiments, a wheel hub assembly includes a cover 40 that has a shaped end wall 41 provided with shaped stiffening elements 44 and a keying portion 42 comprising a bracket 47 force-fitted inside the shaped wall 41 so as to extend projecting from said shaped wall along the axis X and having, in turn, a free end 48 folded back radially on the outside of the axis (X) and defining a second radial edge 48 of the said two radial edges 43, 48.

We claim:

1. A wheel hub assembly having a central axis (X), the wheel hub assembly comprising:
   an outer ring provided with a tubular mounting portion; and
   a cover having a keying portion which is inserted inside the tubular mounting portion;
   wherein the cover is made of plastic material, further wherein the keying portion comprises an annular seat made of plastic and an annular sealing element comprising rubbery elastic material, further wherein the annular sealing element is mounted inside the annular seat over an entire axial length of the annular seat so as to project radially outside of the annular seat to make contact with the tubular mounting portion of the outer ring thereby sealingly closing the wheel hub assembly;
   wherein the annular seat is axially bounded by two radial edges each axially contacting the annular sealing element, the annular sealing element projecting radially outside of at least a first radial edge of the two radial edges.

2. The wheel hub assembly of claim 1, wherein the annular seat comprises a cylindrical seating surface and the annular sealing element comprises a nominal diameter with a radially outward length dimension smaller than a length of an outer diameter of the cylindrical seating surface prior to mounting in the annular seat, and wherein the annular sealing element further has an elastic modulus that ensures an angularly and axially stable connection between said annular seat and sealing element.

3. The wheel hub assembly of claim 2, wherein the cover has a shaped end wall provided with shaped stiffening elements, further wherein the keying portion comprises a bracket inside of the shaped wall so as to extend projecting from said shaped wall along the axis (X) and comprises a free end folded back radially away from the axis (X) and defining a second radial edge of the said two radial edges.

4. A cover for a wheel hub assembly, comprising:
a keying portion configured for inserting into a tubular mounting portion of an outer ring of a wheel hub assembly, wherein the cover is made of a plastic material;
wherein the keying portion comprises an annular seat made of plastic and an annular sealing element made of rubbery elastic material, further wherein the annular sealing element is mounted inside the annular seat over an entire axial length of the annular seat so as to project radially outside of the annular seat and configured to make contact with the tubular mounting portion of the outer ring of the wheel hub assembly thereby sealingly closing the wheel hub assembly;
wherein the annular seat is axially bounded by two radial edges each axially contacting the annular sealing element, the annular sealing element projecting radially outside of at least a first radial edge of the two radial edges.

5. A wheel hub assembly having a central axis (X), the wheel hub assembly, comprising:
an outer ring provided with a tubular mounting portion; and
a cover having a keying portion which is inserted inside the tubular mounting portion;
wherein the cover is made of plastic material, further wherein the keying portion comprises an annular seat made of plastic and an annular sealing element made of rubbery elastic material, further wherein the annular sealing element mounted inside the annular seat over a whole of an axial length of the annular seat so as to project radially outside of the annular seat to make contact with the tubular mounting portion of the outer ring thereby sealingly closing the wheel hub assembly, further wherein the seat is axially bounded by two radial edges each axially contacting the sealing element which projects radially outside of at least a first radial edge of the two radial edges, and further wherein the cover has a shaped end wall provided with shaped stiffening elements, further wherein the keying portion comprises a bracket inside of the shaped wall so as to extend projecting from said shaped wall along the axis (X) and comprising a free end folded back radially away from the axis (X) and defining a second radial edge of the said two radial edges. said two radial edges.

6. The wheel hub assembly of claim 5, wherein the annular seat has a cylindrical mounting surface and the annular sealing element comprises a nominal diameter with a radially outward length dimension smaller than a length of an outer diameter of the cylindrical mounting surface prior to mounting in the annular seat and wherein the annular sealing element further has an elastic modulus that ensures an angularly and axially stable connection between said annular seat and annular sealing element.

7. The wheel hub assembly of claim 1, wherein the annular sealing element comprises a trapezoidal cross-section.

* * * * *